3,413,209
CURRENTIMETRIC SENSOR
Paul A. Hersch, Fullerton, Calif., assignor to Beckman Instruments, Inc., a corporation of California
Filed Nov. 2, 1964, Ser. No. 407,996
7 Claims. (Cl. 204—195)

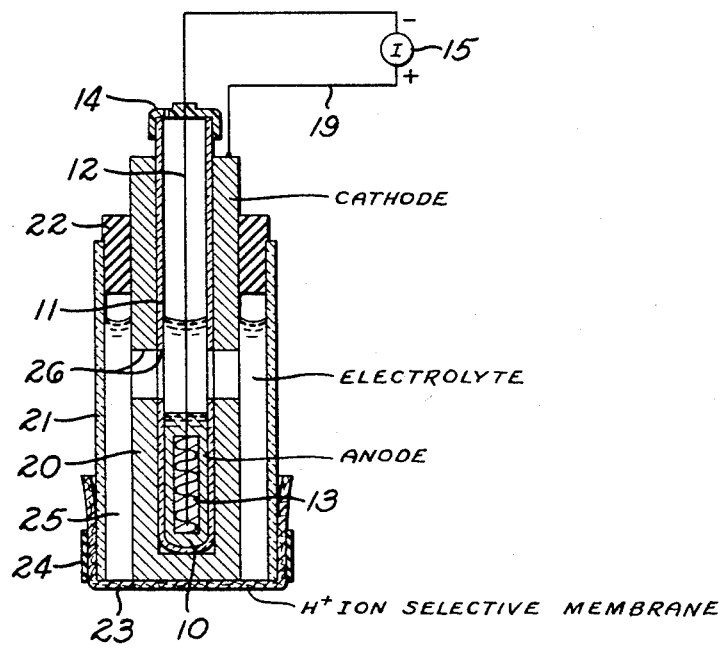

ABSTRACT OF THE DISCLOSURE

A currentimetric cell for measuring the hydrogen ion activity of a solution wherein a nonreactive cathode and activated carbon anode are joined by an iodate electrolyte and are separated from the sample by a hydrogen ion permeable membrane. The current output of the cell is linear.

---

This invention relates to the measurement of acid concentration of samples and, in particular, to a system which measures current as a function of acid concentration with a linear relation between output and concentration.

It is an object of the invention to provide a measuring cell for hydrogen ion concentration which will provide a direct reading output without the requirement of additional power supplies or other equipment. A further object is to provide such a cell which is linear rather than logarithmic thereby providing improved sensitivity at high acid levels.

It is an object of the invention to provide such a measuring cell which is simple and inexpensive in design and construction and reliable and trouble-free in operation. A further object is to provide such a cell in which the electrodes are not exposed to the atmosphere or to the sample. A particular object is to provide such a cell which may take the form of a simple tube or probe which can be directly inserted into the sample.

It is an object of the invention to provide a currentimetric cell for measuring the acid concentration of a sample and having a pair of electrodes, means for mounting the electrodes in spaced relation and including a container for an electrolyte contacting each of the electrodes, a membrane selectively permeable to hydrogen ions forming a portion of the container for exposure to the sample permitting diffusion of hydrogen ions from the sample to the electrolyte, and circuit means for connecting the electrodes across a current meter. A further object is to provide such a cell which is not limited to a particular membrane but one which may utilize any conventional membrane or other equivalent barrier having the desired selective permeability characteristics.

The invention also comprises novel details of construction and novel combinations and arrangements of parts, which will more fully appear in the course of the following description. The single figure of the drawing merely shows and the description merely describes a preferred embodiment of the present invention which is given by way of illustration or example.

Referring to the drawing, an anode 10, preferably in the form of a sludge of activated carbon and electrolyte, is disposed in the closed lower end of a tube 11, the tube being of an electrical insulating material, typically glass. An electrical connection is made to the anode, as by means of a wire conductor 12 having its lower end woven into a piece of graphite cloth 13 with the cloth immersed in the anode sludge. The conductor 12 passes through an apertured cap 14 and is directed to one terminal of a current meter 15, typically a microammeter which may be calibrated directly in hydrogen ion concentration if desired.

A cathode 20 is positioned about the glass tube 11 and is formed of an inactive electrode material, for example, an inactive carbon tube or a platinum wire screen. The carbon tube embodiment is illustrated in the drawing. Another conductor 19 connects the cathode 20 to the other terminal of the meter 15.

The structure comprising the two electrodes is mounted in another tube 21 by means of an annular plug 22. The tube 21 is made of an electrical insulating material, typically glass, and has its lower end closed by a membrane 23 which may be held in place by an elastic band 24. The lower end of the cathode 20 normally rests on the membrane 23 providing an annular electrolyte space 25 within the tube 21. The tube 11 and the cathode 20 are provided with openings 26 to permit ionic conduction between the anode, the cathode and the membrane.

The membrane is permeable to hydrogen ions while being nonpermeable to larger ions which may be present in the sample and which may affect the reaction in the cell. It is also nonpermeable to reactant ions, such as iodate ions, which are utilized in the operation of the cell and which must be kept confined within the cell electrolyte. The membrane functions as a barrier and any suitable structure having the desired characteristic of selective permeability can be used. The presently preferred membrane materials are radiation modified polytetrafluoroethylenes. One such material is Permion 1010 manufactured by Radiation Applications Incorporated. This material is a one mil thick strong acid (sulfonic acid) ion exchange membrane prepared by the sulfonation of a graft copolymer of styrene on a Teflon TFE base film. The average pore size of this membrane is in the 30–40 Angstrom range. It is also possible to provide a barrier means permeable only to the desired ions by positioning a thin film of selectively permeable fluid between two thin fixed permeable plates or membranes. Such a barrier means would function in the same manner and for the same purpose as the plastic membrane illustrated. The word "membrane" as used in the specification and claims is intended to include any barrier selectively permeable to hydrogen ions.

In use, the membrane of the cell is exposed to the sample and hydrogen ions from the sample diffuse through the membrane into the electrolyte. The membrane establishes a diffusion controlled supply of hydrogen ions and a diffusion gradient is established across the membrane. One side of the membrane is exposed to the ionic concentration to be measured while on the other side the concentration is virtually zero since the ions are consumed in the current generating process. The current output is linear rather than logarithmic and provides measuring capabilities for high concentrations which are not readily measured on a pH scale.

Typically the electrolyte is an aqueous solution of potassium chloride and potassium iodate. The reaction at the cathode is

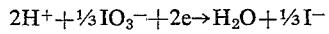

$$2H^+ + \tfrac{1}{3}IO_3^- + 2e \rightarrow H_2O + \tfrac{1}{3}I^-$$

and the reaction at the anode is

$$3 \ldots C + H_2O - 2e \rightarrow \ldots CO + 2 \ldots CH^+$$

where . . . C denotes carbon atoms at the edge of the graphite microcrystallites of the activated carbon anode.

Other suitable electrolyte materials include potassium bromide and potassium iodide which may be used in place of or in conjunction with the potassium chloride. Also, sodium iodate may be used in place of or in conjunction with the potassium iodate.

In the preferred construction illustrated in the drawing, the reaction zone of the electrolyte is in the annular ring about the lower end of the cathode with the hydrogen ions travelling through the annular ring portion of the membrane and through the electrolyte to the side wall of the cathode. Hydrogen ion travel may also occur through the central portion of the membrane and through the thin film of electrolyte to the bottom of the cathode. It it is desired to have this area of the structure participate in the operation, a thin piece of filter paper, lens tissue, or the like may be positioned between the end of the cathode and the membrane to serve as a carrier aiding in bringing electrolyte into the film space.

It should be noted that the cell is not limited to the measurement of hydrogen ion concentration in liquid samples. The cell is equally adapted for measurement of hydrogen ion concentration in gaseous samples such as the measurement of acidic vapors in gas flow paths and in the atmosphere.

Although an exemplary embodiment of the invention has been disclosed and discussed, it will be understood that other applications of the inventions are possible and that the embodiment disclosed may be subjected to various changes, modifications and substitutions without necessarily departing from the spirit of the invention.

I claim is my invention:

1. In a currentimetric cell for measuring the acid concentration of a sample, the combination of:
    a pair of electrodes;
    means for mounting said electrodes in spaced relation and including a container for an electrolyte contacting each of said electrodes;
    a membrane selectively permeable to hydrogen ions forming a portion of said container for exposure to the sample permitting diffusion of hydrogen ions from the sample to the electrolyte; and
    circuit means for connecting said electrodes across a current meter.

2. In a currentimetric cell for measuring the acid concentration of a sample, the combination of:
    a nonreactive cathode;
    an activated carbon anode;
    means for mounting said anode and cathode in spaced relation and including a container for an electrolyte contacting said cathode and anode;
    a membrane selectively permeable to hydrogen ions carried on said container for exposure to the sample permitting diffusion of hydrogen ions from the sample to the electrolyte; and
    circuit means for connecting said cathode and anode across a current meter.

3. In a currentimetric cell for measuring the acid concentration of a sample, the combination of:
    a nonreactive cathode;
    an activated carbon anode;
    means for mounting said anode and cathode in spaced relation and including a container for an electrolyte contacting said cathode and anode,
    with the electrolyte comprising an aqueous solution including at least one of KCl, KBr, and KI and at least one of $KJO_3$ and $NaIO_3$;
    a membrane selectively permeable to hydrogen ions carried on said container for exposure to the sample permitting diffusion of hydrogen ions from the sample to the electrolyte; and
    circuit means for connecting said cathode and anode across a current meter.

4. In a currentimetric cell for measuring the acid concentration of a sample, the combination of:
    a nonreactive cathoode;
    an activated carbon anode;
    means for mounting said anode and cathode in spaced relation and including a container for an electrolyte contacting said cathode and anode, with said container defining an annular electrolyte volume around said cathode;
    a membrane selectively permeable to hydrogen ions and forming an end of said container for exposure to the sample permitting diffusion of hydrogen ions from the sample to the annular volume of electrolyte; and
    circuit means for connecting said cathode and anode across a current meter.

5. In a currentimetric cell for measuring the acid concentrations of a sample, the combination of:
    a nonreactive cathode;
    an activated carbon anode;
    means for mounting said anode and cathode in spaced relation and including a container for an electrolyte contacting said cathode and anode, with said cathode having an end electrically remote from said anode and with said container defining an annular electrolyte volume around said cathode end;
    a membrane selectively permeable to hydrogen ions and forming an end of said container at said cathode end providing an electrolyte film space between said membrane and cathode for exposure to the sample permitting diffusion of hydrogen ions from the sample to the electrolyte; and
    circuit means for connecting said cathode and anode across a current meter.

6. In a currentimetric cell for measuring the acid concentration of a sample, the combination of:
    a first electrically insulating tube;
    an anode disposed within said first tube;
    a cathode disposed about said first tube;
    a second electrically insulating tube having a membrane selectively permeable to hydrogen ions closing an end thereof;
    means for mounting said first tube, anode and cathode within said second tube, with said first tube and cathode having electrolyte passages permitting electrolyte within said second tube to contact the inner surface of said membrane, said cathode and said anode; and
    circuit means for connecting said cathode and anode across a current meter, with exposure of the outer surface of said membrane to a sample permitting diffusion of hydrogen ions from the sample to the electrolyte.

7. A currentimetric cell for measuring the acid concentration of a sample comprising:
    a reactive anode, a nonreactive cathode and an electrolyte;
    barrier means selectively permeable to hydrogen ions;
    means for mounting said anode and cathode in spaced relation with said electrolyte in contact therewith and in contact with one side of said barrier means, with exposure of the other side of said barrier means to the sample permitting diffusion of hydrogen ions from the sample to the electrolyte; and
    circuit means for connecting said cathode and anode across a current meter.

References Cited

UNITED STATES PATENTS

| | | | |
|---|---|---|---|
| 2,755,243 | 7/1956 | Beckman et al. | 204—195.1 |
| 3,098,813 | 7/1963 | Beebee et al. | 204—195 |
| 3,103,480 | 9/1963 | Watanabe et al. | 204—195.1 |
| 3,325,378 | 6/1967 | Greene et al. | 204—195 |

HOWARD S. WILLIAMS, *Primary Examiner.*

T. TUNG, *Assistant Examiner.*